April 14, 1925.

S. W. RAYMOND 1,533,809

TRACTOR WHEEL SHIFT MECHANISM

Filed March 23, 1923      3 Sheets-Sheet 1

April 14, 1925.  
S. W. RAYMOND  
1,533,809  
TRACTOR WHEEL SHIFT MECHANISM  
Filed March 23, 1923  3 Sheets-Sheet 2
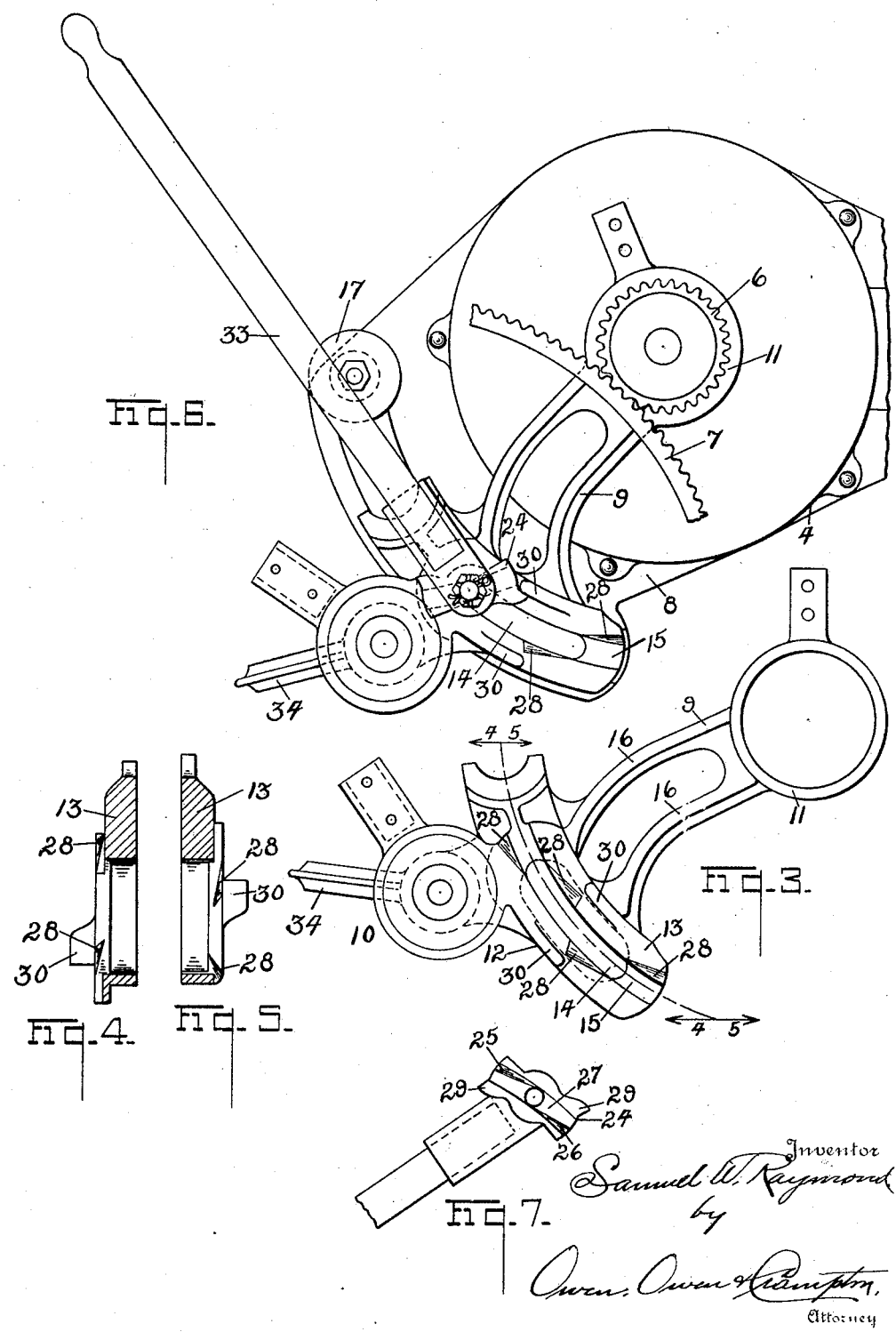

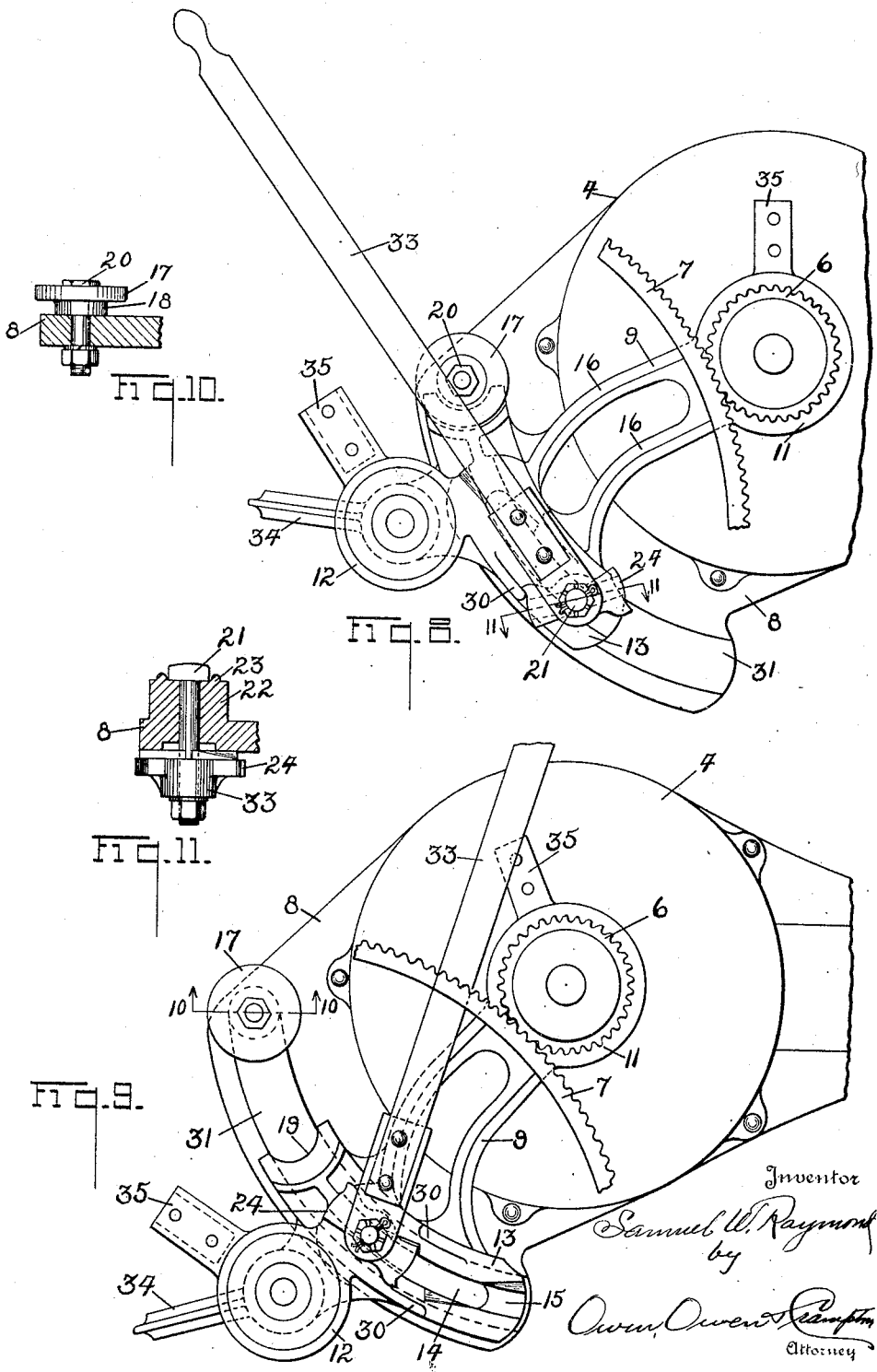

Patented Apr. 14, 1925.

1,533,809

UNITED STATES PATENT OFFICE.

SAMUEL W. RAYMOND, OF ADRIAN, MICHIGAN.

TRACTOR-WHEEL SHIFT MECHANISM.

Application filed March 23, 1923. Serial No. 627,058.

*To all whom it may concern:*

Be it known that I, SAMUEL W. RAYMOND, a citizen of the United States, and a resident of Adrian, in the county of Lenawee and State of Michigan, have made an invention appertaining to a Tractor-Wheel Shift Mechanism, which invention is fully set forth in the following specification.

My invention has for its object to produce a means for shifting one of the traction elements of a tractor, relative to the body of the tractor, into such a position that the tractor body will be maintained in its normal relation to the horizontal when the surface on which the elements tract varies from the horizontal. The invention particularly has for its object to provide a means that may be easily operated to shift a traction element relative to a body of the tractor. The invention also has for its particular object to provide a means that will securely hold and rigidly connect a traction element to the tractor body that may thus be shifted, either when in its normal position or in the position to which it is shifted to maintain the tractor body substantially in its normal relation to the horizontal, although the surface on which the element tracts is located below the surface on which other parts of the tractor are supported. The invention has for its object to produce other advantages and features which will appear in the following description and upon examination of the drawings.

The invention may be contained in structures of different forms and used in connection with tractors having different kinds of traction elements. To illustrate a practical application of the invention I have selected a tractor having bull wheel traction elements and shown a structure for shifting one of the bull wheels relative to the tractor body or frame. The device illustrated is described in the following description.

Figure 1:
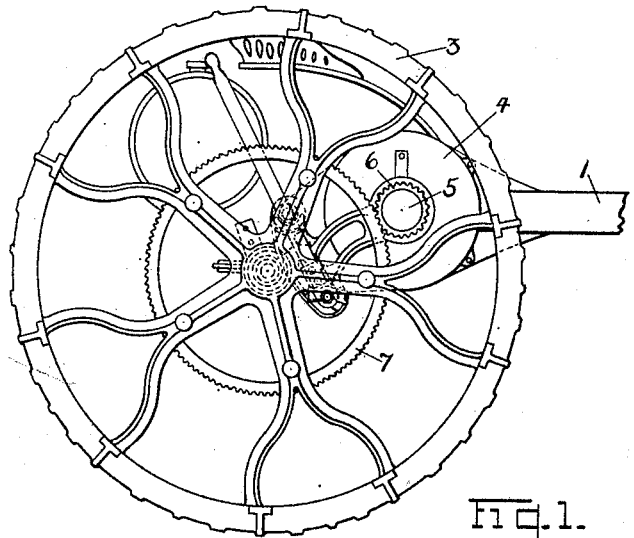
Figure 2:
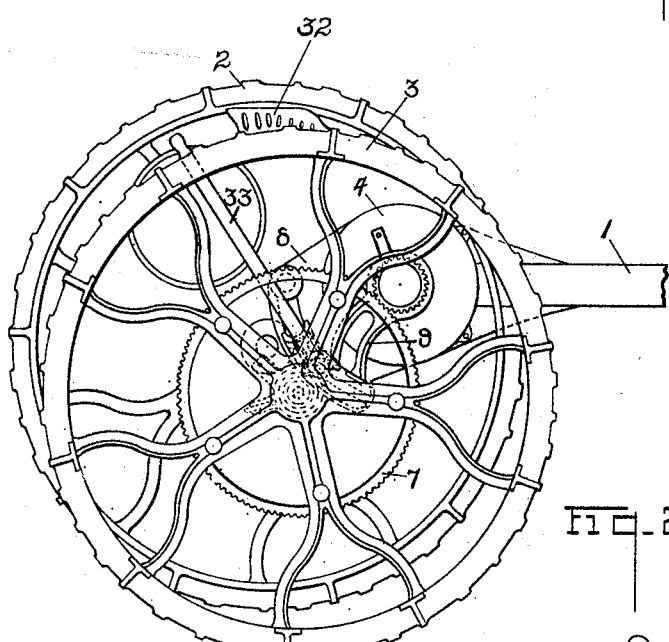

Figure 1 of the drawings illustrates a side view of the rear end of the tractor, showing the bull wheels in their normal position. Fig. 2 illustrates a side view of the rear end of the tractor, showing one of the bull wheels shifted from its normal position. Fig. 3 illustrates a side view of the traction element shifting attachment. Figs. 4 and 5 illustrate sectional views taken on the line indicated in Fig. 3 when looking in the direction of the arrows marked 4—4 and 5—5 respectively. Fig. 6 illustrates a side view of the attachment connected to the tractor. Fig. 7 illustrates a lever and cam for locking the mechanism and the bull wheel in the position to which they are moved. Fig. 8 illustrates the position of the attachment when the bull wheel is in its normal position. Fig. 9 illustrates the position of the attachment when the bull wheel is tracting in a furrow. Fig. 10 is a sectional view taken on the line 10—10 indicated in Fig. 9. Fig. 11 is a sectional view of the attachment taken on the line 11—11 indicated in Fig. 8, and a side view of a locking cam.

The tractor has the usual frame 1 that is provided with suitable brackets and castings for rotatably connecting the bull wheels 2 and 3 to the tractor frame to support the rear end of the tractor. It is also provided with the gear case 4 having the usual jointed jack shaft 5 to which are keyed the pinions 6 that mesh with the gear wheels 7 for driving the bull wheels in the manner well known in the art.

If but one of the bull wheels is to be made shiftable in order that it may be lowered so as to tract in the furrow during the plowing of a field and at the same time to maintain the jack shaft 5 in substantially horizontal position, the side of the casing 4, or of the frame 1 on which the bull wheel is located, is provided with a broad casting or bracket 8 for presenting a broad contacting or bearing surface over which the attachment may move to provide a good bearing surface for holding the bull wheel in alignment. The casting or bracket 8 may be formed integral with the case 4, if desired. The attachment 9 is pivotally supported on the jack shaft 5 or on a boss formed on the casing 4 by means of the bearing part 11. The bull wheel 3 is rotatably connected to the attachment 9 by means of a stub axle secured to the boss 10 having a flange bearing part 12. The distance between the centers of the bearing parts 11 and 12 for the attachment and for the bull wheel is the same as the distance between the centers of the pinion 6 and the gear wheel 7. Between the bearing parts 11 and 12 and in close proximity to the bearing part 12 there is located an oblong arcuate channelled and slotted member 13, the slot 14 and the channel 15 conforming to the circle having its center at the center of the bearing 11. The parts of the attachment are preferably formed integral and are designed to withstand the strains and stresses that will be transmitted through the parts connected thereby. It may be provided with a pair of flanged arms 16 that are suitably curved and constructed to rigidly sustain the stresses and strains that this part of the attachment may be subjected to in the operation of the tractor. Furthermore, the attachment is securely held against the broad face of the casting 8 when the bull wheel 3 is in its normal position or in the position to which it is shifted.

The casting 8 is provided with a flanged knob or block 17 having the neck 18 that is located in the upper rear corner of the casting bracket 8, and the part 13 of the attachment has a recessed end 19 that substantially fits the neck 18 and beneath the flange of the block 17, which also operates to hold the bull wheel when in its normal position since the end of the part 13 fits under the block 17 and around the neck 18. The block 17 is secured to the casting or bracket 8 by means of the bolt 20. The attachment is also secured in position by means of a bolt 21 that extends through the casting or bracket 8 and a boss 22 formed on the inside of the casting. The bolt is secured from rotation by a suitable means, such as the ridge 23 formed on the end of the boss 22. The attachment is locked to the bolt 21 by means of a clamping cam 24 rotatably supported on the bolt 21, when the bull wheel is in its normal position or in its shifted position.

In order to permit the bull wheel to shift from one position to the other, the attachment is slidably released from the clamping action of the bolt 21 and the clamping cam 24 sufficient to permit sliding movement of the attachment relative to the casting or bracket 8. The bolt 24 extends through the slot 14 formed in the part 13 and the inside of the cam 24, that is, the side adjoining the part 13 of the attachment is provided with bevelled or inclined surfaces 25 and 26. The area 27 between the edges of the surfaces 25 and 26 on the inside of the cam has a width somewhat less than the width of the channel 15, so that when the cam 24 is in one position, the surface 27 will extend along the channel 15 and the part 13 of the attachment may be moved relative to the cam 24. The portions of the part 13 located on opposite sides of the channel 15 are also provided with bevelled or inclined surfaces, such as the surfaces 28, that register with the surfaces 25 and 26 when the attachment is so located that the bull wheel is either in its normal position or in its shifted position. When in either of these positions the cam 24 may be rotated so as to cause the surface 27 of the cam to ride up on the top of the surfaces of the part 13 located on opposite sides of the channel 15 and thus clamp the attachment to the casting or bracket 8.

When it is desired to release the attachment from the casting or bracket 8 the cam 24 may be rotated in a reverse direction so as to place the area 27 in alignment with the channel 15, which will permit the attachment to rotate about the center of the bearing part 11.

To further secure the attachment against movement when it is thus clamped by the cam 24 and the bolt 21 the cam 24 is provided with ears 29 that protrude from the corners of the cam and for engaging shoulders that engage the ends of protruding ridges or bosses 30 formed on the part 13 and at the sides of the channel 15. The protruding ears 29 also form limiting stops for limiting the rotation of the cam 24 when it has been placed in clamping position at either end of the slot 14. Thus when the attachment is in either position it is securely held by and locked against the casting or bracket 8. In order that a suitable bearing and sliding surface, as between the attachment and the casting, may be provided, the casting may be channelled to form the channel 31 and the portions of the casting 8 at the sides of the channel may be finished to form a bearing surface for the part 13 of the attachment along which the part 13 may be freely moved.

In order that the cam 24 may be operated by the driver while seated in the seat 32 of the tractor, a lever 33 may be connected to the cam 24, the lever being located in convenient relation with respect to the seat 32. When, therefore, it is desired to shift the bull wheel 3 relative to the frame, the lever 33 is moved so as to place the longitudinal axis of the cam 24 in the direction of the arcuate channel 15 and the part 13 of the attachment. This may be done by swinging the lever forward. This places the surface 27 of the cam 24 in the channel 15. When this has been done the tractor is started forward, which will cause the pinion 6 to climb up on the gear wheel 7, relatively speaking, or cause the gear wheel 7 to roll under the pinion 6. This is particularly true if there is some resistance to the forward movement of the tractor. If there is not sufficient resistance to the forward movement of the tractor such resistance may be produced by placing the guiding castor or guiding wheels at a sharp angle to the direction of the movement of the tractor, as in turning of the tractor, or, inasmuch as the jack shaft is a jointed jack shaft, one of the bull wheels may be held by an individual clutch and resistance to forward movement will be produced, which will cause the gear wheel to roll under the pinion. The attachment will be rotated down relative to the body of the tractor until the upper end of the slot 14 engages the bolt 21, whereupon the lever 33 may be swung rearwardly to cause the bevelled edges of the cam 24 to slide up on the bevelled edge of the part 13 and the surface 27 of the cam 24 to engage the surfaces on each side of the channel 15 of the part 13 of the attachment, whereby the attachment will be clamped in the position to which it is carried by the movement of the gear wheel 7. This will place the bull wheel 3 in such a position that when the tractor is plowing the tractor frame will be held substantially in its normal position relative to the horizontal, although the bull wheel 3 will be moving or tracting in the furrow produced in a preceding plowing operation. When it is desired to leave the work of plowing, the bull wheel 3 may be replaced in its normal position by again swinging the lever 33 forward to loosen the cam 24 and consequently loosen the attachment so as to permit it to freely swing about the center or axis of the driving pinion 6. The tractor may then be backed and, if there is sufficient resistance to this backward movement, the pinion 6 will move over the gear wheel 7, that is, the rotation of the pinion 6 will carry it down about the center or axis of the bull wheel 3 until the lower end of the channel 14 comes in contact with the bolt 21, whereupon the lever 33 may again be swung rearwardly to clamp the attachment to the face of the casting or bracket 8. This affords an exceedingly convenient arrangement since the farmer can readily and at will adapt the tractor to the work of plowing or to driving or drawing over a substantially level ground. He may thus use the tractor for hauling purposes, then plow his field for a part of the day, and then harrow or break up the lumps of the plowed ground and yet maintain the tractor frame in a horizontal position. Furthermore, these changes may be made by merely swinging the controlling lever 33 and causing the traction elements to rotate.

If desired, a clevis 34 for receiving a chain or other connecting device may be formed integral with the bearing part 12 of the attachment, whereby a plow or drag or any other device may be connected to the tractor at this point. Also, if desired, a shield may be secured to the attachment by means of the arms or lugs 35 that are connected respectively to the bearing parts 11 and 12. The shield may be formed in any suitable shape to substantially cover the attachment and yet so as to prevent interference with the tractor parts.

I claim:

1. In a tractor, a tractor frame, a driving pinion, a member supported for pivotal movement about the axis of the driving pinion, a bull wheel connected to the member, a gear wheel for connecting the bull wheel with the driving pinion, the member having a slot, a pin extending through the slot and connected to the frame and a clamping cam located on the pin for clamping the member to the frame.

2. In a tractor, a tractor frame, a driving pinion, a member supported for pivotal movement about the axis of the driving pinion, a bull wheel connected to the member, a gear wheel for connecting the bull wheel with the driving pinion, the member having a slot, a pin extending through the slot and connected to the frame, a clamping cam located on the pin for clamping the member to the frame and a lever for operating the cam.

In testimony whereof, I have hereunto signed my name to this specification.

SAMUEL W. RAYMOND.